(12) United States Patent
Mattiasson et al.

(10) Patent No.: US 7,547,395 B2
(45) Date of Patent: Jun. 16, 2009

(54) MACROPOROUS GEL, ITS PREPARATION AND ITS USE

(75) Inventors: Bo Mattiasson, Hjärup (SE); Igor Galaev, Lund (SE); Vladimir Lozinsky, Moscow (RU); Fatima Plieva, Lund (SE)

(73) Assignee: Protista Biotechnology AB, Lund (SE)

( * ) Notice: Subject to any disclaimer, the term of this patent is extended or adjusted under 35 U.S.C. 154(b) by 31 days.

(21) Appl. No.: 10/492,404

(22) PCT Filed: Oct. 11, 2002

(86) PCT No.: PCT/SE02/01856

§ 371 (c)(1), (2), (4) Date: Sep. 23, 2004

(87) PCT Pub. No.: WO03/041830

PCT Pub. Date: May 22, 2003

(65) Prior Publication Data

US 2005/0019770 A1    Jan. 27, 2005

(30) Foreign Application Priority Data

Oct. 12, 2001  (SE) .................................. 0103404

(51) Int. Cl.
*B01D 15/08*    (2006.01)
(52) U.S. Cl. .................... 210/656; 210/635; 210/198.2; 210/502.1; 521/28; 521/30; 521/50
(58) Field of Classification Search ................. 210/656, 210/635, 198.2, 502.1; 521/28, 30, 50
See application file for complete search history.

(56) References Cited

U.S. PATENT DOCUMENTS

| | | | | |
|---|---|---|---|---|
| 3,920,397 A * | 11/1975 | Small et al. | .................... | 436/79 |
| 5,057,426 A | 10/1991 | Henco et al. | | |
| 5,491,096 A * | 2/1996 | Sportsman | .................. | 436/518 |
| 5,981,826 A * | 11/1999 | Ku et al. | .................. | 623/23.72 |
| 6,117,326 A * | 9/2000 | Schure et al. | ............... | 210/635 |
| 6,238,565 B1 * | 5/2001 | Hatch | .......................... | 210/635 |
| 6,281,257 B1 | 8/2001 | Ma et al. | | |
| 6,664,305 B2 * | 12/2003 | Jungbauer et al. | ............. | 521/64 |
| 6,887,384 B1 * | 5/2005 | Frechet et al. | ............... | 210/634 |
| 2003/0054342 A1 * | 3/2003 | Star et al. | ....................... | 435/5 |
| 2003/0232895 A1 * | 12/2003 | Omidian et al. | ............... | 521/99 |
| 2005/0019770 A1 * | 1/2005 | Mattiasson et al. | ............. | 435/6 |
| 2005/0029191 A1 * | 2/2005 | Mattiasson et al. | ........... | 210/634 |
| 2007/0163960 A1 * | 7/2007 | Mattiasson et al. | ........... | 210/656 |
| 2008/0090918 A1 * | 4/2008 | Mattiasson et al. | ........... | 516/106 |

FOREIGN PATENT DOCUMENTS

| | | | |
|---|---|---|---|
| SU | 1008214 | * | 3/1983 |
| WO | WO 01/07597 A1 | | 2/2001 |
| WO | WO 02/060553 A1 | | 8/2002 |

OTHER PUBLICATIONS

Lozinski (SU 1008214) and PTO Translation 06-6590 of Lozinski (SU 1008214) Sep. 2006, pp. 1-7.*
Database WPI, Week 198407 Derwent Publications Ltd., London, GB; AN 1984-040917 & SU 1008214 A (Heteroorg CPDS AS USSR) Mar. 30, 1983 abstact.
Database WPI, Week 200026 Derwent Publications Ltd., London, GB; AN 2000-301655 & RU 2130069 C1 (AS Russia Heteroorganic CPDS Inst), May 10, 1999 abstract.
Advances in polymer science, vol. 105, 1993, I. Kaetsu: "Radiation Synthesis of Polymeric Materials for Biomedical and Biochemical Applications", pp. 81-97.
Database WPI, Week 199733 Derwent Publications Ltd., London, GB; AN 1997-361992 & RU 2070901 C1 (AS Russia Food Products Inst), Dec. 27, 1996.
Vladimir I Lozinsky, et al. "Study of Cryostructuring of Polymer Systems. XIX. on the Nature of Intermolecular Links in the Cryogels of Locust Bean Gum", © 2000 Society of Chemical Industry. *Polym Int* 0959-8103/2000/$30.00, pp. 1434-1443.
N. R. Konstantinova et al., "Cryotropic Gelation of Ovalbumin Solutions", vol. 11 No. 2pp. 113-123, 1997, Food Hydrolocolloids.
V. I. Lizinsky et al., "Poly(Vinyl Alcohol) Cryogels Employed as Matrices for Cell Immobilization. 3. Overview of Recent Research and Developments", Enzyme and Microbial Technology 23:227-242, 1998 © 1998 Elsevier Science Inc. All rights reserved.
"The Potential of Polymeric Cryogels in Bioseparation", Vladlmir I. Lozinsky et al., pp. 163-188, (2002).

* cited by examiner

*Primary Examiner*—Ernest G Therkorn
(74) *Attorney, Agent, or Firm*—McDermott Will & Emery LLP

(57) ABSTRACT

A separation medium in macroporous gel form is disclosed which is obtainable by cooling an aqueous solution of at least one gel forming polymer to a temperature, at which the solvent in the system is partially frozen with the dissolved substances concentrated in the non-frozen fraction of the solvent, said gel forming polymer being selected from the group consisting of polymers normally forming gels too fast when an aqueous solution thereof is cooled to a temperature within a range below 0° C. to enable the formation of a cryogel and said cooling being carried out in the presence of at least one chaotropic agent in said aqueous solution in order to prevent gel formation before the polymer solution is frozen. The use of said separation medium for diverse separation purposes is also disclosed.

9 Claims, No Drawings

MACROPOROUS GEL, ITS PREPARATION AND ITS USE

REFERENCE TO RELATED APPLICATIONS

This application is a 371 of PCT/SE02/01856 filed Oct. 11, 2002.

TECHNICAL FIELD

The present invention relates to a macroporous gel, its preparation and its use. More particularly, the invention relates to a macroporous gel for chromatographic separations and separations in an electrical, the preparation of such a separation medium in the form of a cryogel and the use of said separation medium.

BACKGROUND ART

Recent progress in biosciences resulted in redirecting of research interests to a large extent from individual bio-molecules to the problems how these biomolecules are organized in more complex structures and how these structures function in the living cell. Extensive experience of working with individual biomolecules resulted in the development of numerous highly efficient techniques for the isolation and purification of molecular objects with molecular weights less than $10^6$ Da. Contrary, the purification of larger objects, often combined under the name of nanoparticles, like plasmids, cell organelles, viruses, protein inclusion bodies, macromolecular assemblies as well as the separation of cells of different kind still remains a challenge. Large particle sizes (100-1000 nm), low diffusion rates, and complex molecular surfaces distinguish such objects from protein macromolecules (commonly <10 nm).

Traditionally used approaches for isolation of nanoparticles, as ultracentrifugation and micro/ultrafiltration are limited either in scale or resolution due to the similarities of size and density of cell debris and target nanoparticles. Partitioning in aqueous two-phase systems could be used alternatively for the isolation of nanoparticles but it suffers from the necessity to separate the target product from the phase-forming polymer.

Selective adsorption to a chromatographic matrix is a method, which offers many potential advantages with respect to resolution scale-up and process integration. It is noteworthy that only a small number of commercial chromatographic matrixes such as Sephacryl S-1000 SF from Amersham Pharmacia are claimed to accommodate spherical particles up to 400 nm in diameter within the intra-particle pores.

Nanoparticles and cells have very low diffusion coefficients due to the large size and they could be forced inside the pores only by a convective flow. For beaded chromatographic matrices most of the convective flow in the column goes through the voids in between the beads. Even for recently developed superporous beads with pore size of 800 nm up to 95% of the flow goes through the voids around the beads.

In early 90-s Svec, F. and Fréchet, J. M., Science 273:205-211 (1996), suggested to use molded continuous chromatographic media or so called macroporous monoliths, produced by the controlled polymerization inside the chromatographic column. Typically these monoliths are produced by polymerization of styrene or acrylate monomers and contain flow-through pores with diameters in the range of 700-2000 nm (0.7-2 µm). Later on, continuous superporous chromatographic media with pores as large as 20-200 µm were produced from agarose by Gustavsson, P. E. and Larsson, P-O., J. Chromatog. A. 795:199-210 (1998); Braas, G M F, et al., Trans. Inst. Chem. Eng. 78:11-15 (2000). These pores could easily accommodate objects as large as yeast cells.

Cryogels have appeared recently as a new class of materials with a combination of unique properties. Highly porous polymeric materials with a broad variety of morphologies could be produced from practically any gel-forming precursors using cryotropic gelation technique. Cryotropic gelation (cryogelation or cryostructuration are often used synonyms) is a specific type of gel-formation which takes place as a result of cryogenic treatment of the systems potentially capable of gelation. [Lozinsky, V. I., Vainerman, E. S., Rogozhin, S. V., Method for the preparation of macroporous polymer materials, SU Inventor's Certificate No. 1008214 (1982).] The essential feature of cryogelation is compulsory crystallization of the solvent, which distinguishes cryogelation from chilling-induced gelation when the gelation takes place on decreasing temperature e.g. as gelation of gelatine or agarose solutions which proceeds without any phase transition of the solvent.

The processes of cryogelation have some unique characteristics.

1. Cryotropic gel formation is a process which proceeds in a non-frozen liquid microphase existing in the macroscopically frozen sample. At moderate temperatures below the freezing point some of the liquid remains still non-frozen accumulating in high concentrations (so called cryoconcentrating) all the solutes present in the initial solution. Chemical reactions or processes of physical gelation proceed in the non-frozen microphase at apparently much higher concentrations than in the initial.

2. The result of cryoconcentrating of dissolved substances in non-frozen liquid is a decrease in the critical concentration of gelation as compared to traditional gelation at temperatures above the freezing point.

3. Usually cryogelation in moderately frozen samples proceeds faster than traditional gelation at temperatures above the freezing point.

4. Frozen crystals of the solvent play a role of porogen when cryogels are formed producing a system of interconnected macropores. The macropore size could be as large as a few hundreds µm (Ø). The cryogels have often sponge-like morphology contrary to continuous monophase traditional gels produced from the same precursors at temperatures above freezing. Most of the solvent in cryogels is capillary bound and could be easily removed mechanically.

5. Temperature dependence of cryogelation has usually an optimum due to the balance between the effects facilitating gelation (cryoconcentrating) and factors decelerating it (low temperature, high viscosity in liquid microphase).

6. Cryogels are mechanically strong, but non brittle due to the elasticity of polymer walls in between macropores.

7. The porosity, mechanical strength and density of cryogels could be regulated by the temperature of cryogelation, the time a sample is kept in a frozen state and freezing/thawing rates.

The production of cryogels in general is well documented. For a review, vide e.g. Kaetsu, I., Adv. Polym. Sci. 105:81 (1993); Lozinsky, V. I. and Plieva, F. M., Enzyme Microb. Technol. 23:227-242 (1998); and Hassan, Ch. M. and Peppas, N. A., Adv. Polym. Sci. 151:37 (2000).

The most intensely studied cryogels are those prepared from poly(vinyl alcohol) (PVA) due to their easy availability. Thus when cooling an aqueous solution of PVA to a temperature within a range below 0° C. the ratio between gelling of the PVA and the crystallization of water is such that cryogels are easily formed. However, the preparation of cryogels by polymerizing an aqueous solution of monomers under chilling to a temperature below 0° C., at which water in the system is partially frozen with the dissolved substances concentrated in the non-frozen fraction of water, to the formation of a cryogel is also disclosed in literature. Thus, the preparation of cryogels by polymerizing an aqueous solution of acrylamide and N,N'-methylene-bis-acrylamide in the presence of a radical polymerization initiator under chilling to a temperature below 0° C. is disclosed, e.g. by E. M. Belavtseva et al., Colloid & Polymer Sci. 262:775-779 (1984); V. I. Lozinsky et al., Colloid & Polymer Sci. 262:769-774 (1984) and D. G. Gusev et al., Eur. Polym. J. Vol. 29, No. 1, 49-55, 1993. However, these references only report on studies of the cryostructurization of this polymer system and no practical use for the cryogels is suggested therein.

Further cryogels prepared by polymerizing an aqueous solution of monomers under chilling at a temperature at which solvent in the system is partially frozen with the dissolved substances concentrated in the non-frozen fraction of the solvent is disclosed in SU Inventor's Certificate No. 1008214. However, no use of the cryogels as a separation medium is disclosed therein.

It is an object of the present invention to provide new macroporous gels which can be used as a separation medium for chromatographic separations and separations in an electrical field.

It is another object of the present invention to provide macroporous gels prepared by polymerizing one or more monomers in solution under freezing to a temperature below the solvent crystallization point and having improved properties due to the presence of specific additives in said solution.

It is still another object of the present invention to provide macroporous gels prepared by polymerizing one or more monomers in solution under freezing to a temperature below the solvent crystallization point and having been modified to exhibit properties particularly suited for their use as a separation medium.

It is another object of the present invention to provide macroporous gels which can be used for the separation of cells, viruses or nanoparticles from suspensions thereof.

It is a further object of the present invention to provide macroporous gels which can be used for the separation of cells from a cell mixture according to specific properties of their surface.

It is also an object of the present invention to provide macroporous gels which can be used for adsorption affinity chromatography of microbial cells carrying a metal-binding peptide expressed at their surface.

It is still a further object of the present invention to provide macroporous gels which can be used for the separation of low-molecular weight products or proteins from a cellular suspension or crude homogenate according to the charge, hydrophobicity or affinity of the products or proteins.

These and other objects are attained by means of the present invention.

DISCLOSURE OF THE INVENTION

According to one aspect of the present invention there is provided a macroporous gel obtainable by a) polymerizing an aqueous solution of one or more water-soluble monomers selected from the group consisting of:
N-substituted and non-substituted (meth)acrylamides;
N-alkyl substituted N-vinylamides;
hydroxyalkyl (meth)acrylates;
vinylacetate;
alkylethers of vinyl alcohol;
ringsubstituted styrene derivatives;
vinyl monomers;
(meth)acrylic acid and salts thereof;
silicic acid; and
monomers capable of forming polymers via polycondensation, under freezing at a temperature below the solvent crystallization point, at which solvent in the system is partially frozen with the dissolved substances concentrated in the non-frozen fraction of solvent to the formation of a cryogel, and b1) modifying the cryogel by introducing a member selected from the group consisting of ligands, charged groups, dyes and hydrophobic groups thereinto (i) in one or more steps by methods known per se subsequent to thawing of the cryogel or (ii), when appropriate, by using appropriately substituted monomers in the polymerization reaction; or b2) carrying out the polymerization in the presence of a filler, or;

b3) carrying out the polymerization in the presence of a filler and, after thawing of the cryogel, modifying the cryogel as set forth under b1) above.

The macroporous gels may be homopolymers as well as copolymers.

For use in the present invention monomers, monomer combinations and reaction initiator systems, when necessary, are chosen which may expected from literature and practice to be sufficiently reactive to form polymers at the low temperatures contemplated for the preparation of cryogels.

Examples of N-substituted and non-substituted (meth)acrylamides to be used in the preparation of the macroporous gels according to the invention are acrylamide, methacrylamide, N,N-diallyl acrylamide, N,N'-methylene-bis-acrylamide, N,N'-methylene-bis-methacrylamide, N,N'-hexamethylene-bis-acrylamide, N,N-diethylacrylamide, N-isopropylacrylamide, N-butyracrylamide, N-(2-hydroxypropyl)methacrylamide.

Examples of N-alkyl substituted N-vinylamides to be used in the preparation of the macroporous gels according to the invention are N-vinyl pyrrolidone, N-vinyl caprolactam, N-vinyl-N-methylacetamide, N-vinyl-N-ethylacetamide.

Examples of hydroxyalkyl (meth)acrylates to be used in the preparation of the macroporous gels according to the invention are poly(ethylene glycol)diacrylates, (ethylene glycol) dimethacrylate, 2-hydroxyethylmethacrylate, 2-hydroxypropyl- methacrylate, 2-hydroxyethylacrylate, 4-hydroxybutylmethacrylate.

Examples of alkyl ethers of vinyl alcohol to be used in the preparation of the macroporous gels according to the invention are vinyl methyl ether, vinyl ethyl ether, vinyl propyl ether, vinyl isopropyl ether, vinyl butyl ether.

Examples of ringsubstituted styrene derivatives to be used in the preparation of the macroporous gels according to the invention are 4-styrenesulfonic acid sodium salt, 4-chloromethylstyrene, methylstyrene, 4-vinylbenzoic acid.

Examples of vinyl monomers to be used in the preparation of the macroporous gels according to the invention are 2-vinylpyridine, 4-vinylpyridine, N-vinylcarbazole, 1-vinylimidazole, vinylazalactone, N-vinylurea.

The salts of (meth)acrylic acid which may be used in the preparation of the macroporous gels according to the invention are primarily the Na, K and ammonium salts.

Examples of monomers capable of forming polymers via polycondensation to be used in the preparation of the macroporous gels according to the present invention are polyamines (such as diaminobenzene, triaminobenzene, lysyllysin, etc.), dialdehydes (such as glyoxal, glutaric aldehyde, terephtalic aldehyde, etc.), multifunctional amino acids and peptides in the presence of water-soluble carbodiimide, and others.

Initiator systems conventionally used in connection with the polymerization of monomers or combinations of monomers of the groups specified above are used when necessary or desired.

The solvent or solvent system used for cryopolymerization is selected from the group consisting of water and mixtures of water and water-miscible organic solvents.

Preferably, the solvent to be used for the cryopolymerization is water alone but water in admixture with a minor amount of one or more water-miscible organic solvents, such as methanol, ethanol, dioxane, acetone, dimethyl sulfoxide, N,N-dimethylformamide and acetonitrile may also be contemplated.

The temperature to which freezing or chilling is carried out depends on the crystallization point of the solvent or solvent system used in each specific case. Said temperature should generally be at least 5° C. below the freezing point of the solvent or solvent system in order to keep the crystallization time down. For instance, in case of water as the solvent, freezing is generally carried out to a temperature within the range of from −5° C. to −40° C., preferably from −10° C. to −30° C.

After the end of the reaction thawing is performed whereafter the cryogel formed is washed thoroughly with appropriate liquids (e.g. water, buffers, surfactant-containing solutions, organic solvents, mixtures of organic solvents with water or with each other) to remove non-polymerized impurities.

According to a preferred embodiment of the macroporous gel according to the invention the cryogel formed as stated above has been modified, after thawing, by introducing a member selected from the group consisting of ligands, charged groups and hydrophobic groups therein in one or more subsequent steps by methods known per se.

In accordance with this embodiment of the macroporous gel of the invention the ligand thus introduced may be selected from the group consisting of peptides, metal chelates, sugar derivatives, boronate derivatives, enzyme substrates and their analogues, enzyme inhibitors and their analogues, protein inhibitors, antibodies and their fragments, ligand structures obtained via combinatorial chemistry and thiol-containing substances.

Also in accordance with this embodiment of the macroporous gel of the invention said gel may have become modified by introducing a member selected from the group consisting of dyes and ion exchange groups thereinto.

An example of a macroporous gel according to this embodiment of the invention is a macroporous gel obtainable by polymerizing under freezing of an aqueous solution of acrylamide and N,N-methylene-bis-acrylamide in the presence of an initiator-system, thawing the cryogel thus formed, transamidating said cryogel using ethylenediamine, thereafter treating with divinylsulfone followed by treatment with iminodiacetic acid and finally loading with $Cu^{2+}$ ions as a ligand for binding with metal-binding peptides.

According to another embodiment of the macroporous gel according to the invention, which embodiment may be practised separately from as well as in combination with the above mentioned embodiment, polymerizing of said solution of one or more monomers has been carried out in the presence of a filler.

Said filler may, for instance, be particulate matter selected from the group consisting of metal oxides or metal powders such as titanium dioxide, molybdenum, stainless steel, iron (III) oxide and zirconium dioxide in order to increase the density of the cryogel.

As an alternative, the filler may be selected from the group consisting of ion exchange substances in the form of particles.

The macroporous gel according to the invention may be obtained in the form of a cross-linked polymer by choosing a combination of starting monomers of which monomers one is a substance exhibiting two polymerizable double bonds, such as, for instance, N,N'-methylene-bis-acrylamide, N,N'-methylene-bis-methacrylamide, N,N'-hexamethylene-bis-acrylamide, N,N-diallyl acrylamide diallyl fumarate, diallyl phthalate and poly(ethylene glycol)diacrylates. However, according to a further embodiment of the macroporous gel according to the invention the cryogel formed by polymerizing has been additionally cross-linked, after thawing, by means of a cross-linking agent selected from the group consisting of alkylenediamines, glutaric aldehyde and di- and triglycidyl compounds, and divinylsulfone (DVS).

The carbon chain of the alkylene diamines to be used as cross-linking agents in accordance with this embodiment may be straight or branched and preferably have from 2 to 8 carbon atoms, more preferably from 4 to 6 carbon atoms in a straight chain.

Examples of di- and triglycidyl compounds to be used as cross-linking agents in accordance with this embodiment of the macroporous gel according to the invention are diglycidyl 1,2-cyklohexane-dicarboxylate, diglycidyl 1,2,3,6-tetrahydro-phthalate, N,N-diglycidylaniline and N,N-diglycidyl-4-glycidyloxyaniline.

The macroporous gel according to the present invention may be in the form of a monolith encased in a column. In this case freezing of the solution of the monomer or monomers and possible initiator substances and suspended filler to the formation of a cryogel is carried out with said solution inside the column. Freezing is carried out at a predetermined temperature, at which the solvent in the system is partially frozen with the dissolved substances concentrated in the non-frozen fraction of the solvent and for a predetermined period whereafter the content of the column is thawed. Then the column is rinsed with solvent to wash out soluble fractions.

Alternatively, the macroporous gel according to the invention is prepared in the form of particles. The preparation of cryogels in particle form from a system comprising water as the solvent has been extensively described in literature. V. I. Lozinsky, Zubov A. L., The plant for formation of spherical granules from material based on aqueous systems, Russian Federation Patent 2036095 (20.10.1992).

In short, an aqueous solution of the monomer(s) and possible initiator substances and suspended filler is pressed into a liquid-jet-head where the jet is splintered into droplets by the flow of a water-immiscible solvent. The droplets are caused to fall down into a column containing the same solvent but cooled to a temperature below the freezing point, e.g. from −10° C. to −30° C. The droplets freeze when sedimenting along the column and are harvested in a collector. The final product in the form of beaded cryogel is obtained after thawing and rinsing with water.

The macroporous gel according to the present invention may also be in the form of disks or membranes. In this case freezing of the solution of the monomer(s) and possible initiator substances and suspended filler to the formation of a cryogel is carried out with said solution within a special form or mould. The above disks of the cryogel may be assembled to form a column-like construction in a special holder.

According to a further aspect of the present invention there is provided a method for the preparation of a separation medium in macroporous gel form, characterized in polymerizing in the presence of a filler an aqueous solution of one or more water-soluble monomers selected from the group consisting of:
N-substituted and non-substituted (meth)acrylamides;
N-alkyl substituted N-vinylamides;
hydroxyalkyl (meth)acrylates;
vinylacetate;

alkylethers of vinyl alcohol;
ringsubstituted styrene derivatives;
vinyl monomers;
(meth)acrylic acid and salts thereof;
silicic acid; and
monomers capable of forming polymers via polycondensation, under freezing at a temperature below the solvent crystallization point, at which solvent in the system is partially frozen with the dissolved substances concentrated in the non-frozen fraction of solvent to the formation of a cryogel and then thawing the reaction product thus obtained.

According to this further aspect of the present invention there is also provided a method for the preparation of a separation medium in macroporous gel form characterized in polymerizing an aqueous solution of one or more water-soluble monomers selected from the group consisting of:
N-substituted and non-substituted (meth)acrylamides;
N-alkyl substituted N-vinylamides;
hydroxyalkyl (meth)acrylates;
vinylacetate;
alkylethers of vinyl alcohol;
ringsubstituted styrene derivatives;
vinyl monomers;
(meth)acrylic acid and salts thereof;
silicic acid; and
monomers capable of forming polymers via polycondensation, under freezing at a temperature below the solvent crystallization point, at which solvent in the system is partially frozen with the dissolved substances concentrated in the non-frozen fraction of solvent to the formation of a cryogel, and modifying the cryogel by introducing a member selected from the group consisting of ligands, charged groups, dyes and hydrophobic groups thereinto (i) in one or more steps by methods known per se subsequent to thawing of the cryogel or (ii), when appropriate, by using appropriately substituted monomers in the polymerization reaction.

Ligands thus introduced may be selected from the group identified in connection with the separation medium above.

Alternatively, the cryogel, after thawing, may be modified by introducing a member selected from the group consisting of ion exchange groups thereinto.

In accordance with an embodiment of the method according to the present invention the polymerization is carried out in the presence of a filler, said filler may be as identified above in connection with the separation medium according to the invention.

In accordance with another embodiment of the method according to the invention polymerization is carried out in the presence of a cross-linking agent. Alternatively, cross-linking may be carried out after thawing of the cryogel formed but before a possible modifying of said cryogel.

Cross-linking agents to be used in this embodiment may be as identified above in connection with the separation medium according to the invention.

In accordance with an example of a specific embodiment of the method according to the present invention an aqueous solution of acrylamide and N,N-methylene-bis-acrylamide is polymerized in the presence of an initiator system under freezing to the formation of a cryogel polymer, thawing the cryogel polymer, which is the transamidated using ethylenediamine, then treated with divinylsulfone followed by the treatment with iminodiacetic acid and finally loading with $Cu^{2+}$ ions as a ligand for binding with metal-binding peptides.

In accordance with a further aspect of the present invention there is provided a use of a macroporous gel according to the present invention modified as set forth above for the separation of cells from a cell mixture according to specific properties of their surface.

According to this aspect of the present invention there is also provided the use of a macroporous gel according to the present invention as identified in claim 8 for adsorption affinity chromatography of microbial cells carrying a metal-binding peptide expressed at their surface.

According to this aspect of the present invention there is also provided the use of a macroporous gel according to the invention modified as set forth above for the separation of low-molecular weight products from a cellular suspension or crude homogenate according to the charge, hydrophobicity or affinity of the products to the ligands, charged groups or hydrophobic groups available at the separation medium.

According to this aspect of the present invention there is also provided the use of a macroporous gel according to the invention modified as set forth above for the separation of proteins and other macromolecules from a cellular suspension or crude homogenate according to the charge, hydrophobicity or affinity of the proteins/macro-molecules to the ligands, charged groups or hydrophobic groups available at said macroporous gel or separation medium.

Further according to this aspect of the present invention there is also provided the use of a macroporous gel according to the invention as identified in claim 8 for the direct capture of recombinant lactate dehydrogenase carrying a tag of a metal-binding peptide from crude homogenate.

According to this aspect of the present invention there is also provided the use of a macroporous gel according to the invention modified as set forth above for the separation of viruses from a virus suspension according to specific properties of their surface.

According to this aspect of the present invention there is also provided the use of a macroporous gel as identified in any of claims 1, 4 and 6 for the separation of plasmids from crude suspensions according to their charge, shape, based exposure and coiling mode.

According to a still further aspect of the present invention there is provided a method for the separation of
a) cells from a cell mixture according to specific properties of their surface;
b) low molecular weight products or macromolecules such as proteins from a cellular suspension or crude homogenate according to charge, hydrophobicity or affinity of said products to at least one member selected from the group consisting of ligands, charged groups and hydrophobic groups;
c) viruses from a virus suspension according to specific properties of their surface; or
d) plasmids from crude suspensions thereof according to their charge, shape, based exposure and coiling mode, by contacting said cell mixture, cellular suspension or crude homogenate, virus suspension and crude plasmid suspension with a separation medium for adsorption of cells, low-molecular weight products or macromolecules e.g. proteins, viruses and plasmids, respectively, to said separation medium and then eluting them therefrom, characterized in that the separation medium is a macroporous gel prepared by a method as disclosed in the instant specification.

The invention will now be further illustrated by means of a number of non-limitative examples.

EXAMPLE 1

Preparation of the Supermacroporous Monolith Column

Co-Polymerization of Acrylamide and N,N-methylene-bis-acryl-amide in the Column

The solution of acrylamide (0.6 g), N,N-methylene-bis-acryl-amide (0.04 g) and N,N,N',N'-tetramethylenediamine (TEMED) (10 μl) in 20 ml water was degassed and after addition of 5 mg of solid ammonium persulfate was slowly poured into the glass column on top of the $CCl_4$ layer. The polymer solution in the column was frozen and kept at −18° C. overnight. Then the column was thawed and a spongy columnar cryogel thus formed was washed thoroughly to remove non-polymerized impurities.

Modification of the Continuous Polyacrylamide Matrix in the Column

The transamidation was carried out by pumping ethylenediamine (EDA) initially slowly at room temperature to replace water. Then EDA was pumped through the column at a high flow rate of 150-200 ml/hr in a recirculating mode and the water with a temperature of 90° C. was circulated through the jacket. After 8-9 hr of reaction the column was cooled to room temperature and was washed with 500 ml 0.2 M NaCl solution then with water and finally with 100 ml 0.5 M $Na_2CO_3$. The progress of transamidation was qualitatively confirmed by the bright yellow color when a small piece of the matrix cut from the top of the column was immersed in a freshly prepared TNBS reagent (5 μl of 5% aqueous solution of trinitrobenzoic acid dissolved in 2 ml saturated sodium borate solution). Then, the divinylsulfone (DVS) suspension produced by vigorous mixing of 2 ml DVS with 20 ml 0.5 M $Na_2CO_3$ using a magnetic stirrer, was pumped through the column for 2 hr at a flow rate 150-200 ml/hr in a recirculating mode. The qualitative test with TNBS showed a pale yellow color indicating nearly complete modification of free amino groups. The matrix was washed till pH of washings was close to neutral and with 100 ml 0.5 M $Na_2CO_3$ and 100 ml 1 M $Na_2CO_3$. Then, IDA solution (3.5 g of iminodiacetic acid dissolved in 30 ml of 1 M $Na_2CO_3$ and pH adjusted to 10-11 by NaOH) was pumped through the column at a flow rate of 150-200 ml/hr in a recirculating mode. Finally, the column was washed with 300 ml 0.5 M $Na_2CO_3$, distilled water till pH of washings was close to neutral and with 100 ml Tris-HCl buffer (20 mM, pH 7.5 containing 50 mM NaCl). The IDA-modified matrix was loaded with $Cu^{2+}$ by pumping 0.1 M $CuSO_4$ solution in Tris-HCl buffer at a flow rate of 100 ml/min and washing extensively with Tris-HCl buffer. The $Cu^{2+}$-loaded matrix acquired an intensive blue color. Due to the large pore size and interconnected pore-structure, the continuous chromatographic poly(acrylamide) matrix has a very low flow resistance. Mobile phases flows freely through the column at a flow rate of 20-40 ml/min depending on the bed height (800-1500 cm/hr) when the pressure was created by lifting water reservoir 1 m above the column (0.01 MPa). No visible changes in the continuous matrix were observed at this flow.

EXAMPLE 2

Adsorption Affinity Chromatography of Microbial Cells on a Supermacroporous Column E. coli cells with a size of 1×3 μm pass rather easily through the pores in the continuous poly(acrylamide) supermacroporous matrix prepared according to Example 1. Contrary, recombinant E. coli cells with a metal-binding peptide His-Ser-Gln-Lys-Val-Phe expressed at the surface of the cells bind specifically to the Cu-IDA-poly(acrylamide) supermacro-porous matrix and are eluted by the buffer containing EDTA, which captures Cu-ions and hence destroy specific interactions between recombinant E. coli cells and the IDA-poly-(acrylamide) cryogel matrix. When the mixed suspension of E. coli cells and recombinant E. coli cells bearing the metal binding peptide expressed at the surface of the cells is applied on the column, the E. coli cells went through the column unbound, while recombinant cells are predominantly retained by the column and are eluted with 20 mM EDTA solution.

In order to prove that the cells were bound inside the pores of the Cu-IDA-poly(acrylamide) cryogel matrix, one monolith column was sacrificed after cell binding, the monolith was removed from the column and a disk was cut from the middle of the monolith. The disc was further cut into one central piece and four peripheral pieces and all the pieces were put on a petri dish with ampicillin containing nutrient medium. Due to the presence of ampicillin only recombinant cells could grow on this medium. The cell growth was approximately the same around all pieces indicating clearly that E. coli cells with a metal-binding peptide bind to the matrix at the same level through all the cross-section area and hence passing through the pores inside the monolith.

EXAMPLE 3

Direct Capture of Recombinant Lactate Dehydrogenase from Crude Homogenate on Continuous Columns Recombinant E. coli cells expressing lactate dehydrogenase (from the thermophile Bacillus stearothermophilus) carrying a tag of six histidine residues ($His_6$-LDH) were grown and induced for enzyme production. The cells were harvested by centrifugation, washed with 25 mM Tris-HCl buffer, pH 7.3 and disrupted by sonication.

The crude extract without pre-purification was applied on a monolith column (2×1.4 cm i.d.) produced according to Example 1 at a flow rate of 1.6 ml/min (60 cm/hr). The column was washed with 25 mM Tris-HCl buffer, pH 7.3 and eluted with the same buffer containing 50 mM EDTA. The enzyme was nearly quantitatively captured from the crude extract with only 4% of the total eluted enzyme activity in the breakthrough fraction, which could be due to the admixtures of the inherent non-recombinant (and hence which cannot bind to the monolith column) lactate dehydrogenase. Bound enzyme was quantitatively eluted in a small volume of 50 mM EDTA of about 2 column volumes.

EXAMPLE 4

Preparation of the Supermacroporous Monolith Column by Co-Polymerization of Acrylamide with Allyl Glycidyl Ether Monomers (Table 1) were dissolved in deionized water and the mixture was degassed under vacuum, allyl glycidyl ether (AGE) ((AAm+AGE)/MBAAm=5.3/1, AGE/AAm=1:10) was poured into the solution. After adding TEMED (1.0% of the total weight of monomers) and ammonium persulfate (0.98% of the total weight of monomers), the reaction mixture was stirred and poured in 5 ml portions into plastic 5 ml syringes with closed outlet at the bottom. The solution in the syringes was frozen at −12° C. The frozen samples were thawed out at room temperature after keeping them frozen at −12° C. for 24 hr or at −12° C. for 5 hr, and then overnight at −18.0° C. The cryogel matrix prepared in each syringe was washed intensively by passing 200 ml water at a flow rate of 1 ml/min.

Supermacroporous gels with high flow rate were prepared when (AAm+AGE)/MBAAm was in the range 5:1-10:1 (mol/mol). The low rate depended less on the ratio (AAm+AGE)/MBAAm in the initial reaction mixture (Table 2).

The produced supermacroporous monolith column contains active epoxy groups, which could be used for covalent coupling of various ligands, e.g. IDA. Fifty ml 0.5 M $Na_2CO_3$ followed by 50 ml 1.0 M $Na_2CO_3$ solutions were passed through the gel matrix at a flow rate of 1 ml/min. The IDA solution (0.5 M in 1.0 M $Na_2CO_3$, pH 10.0) was applied to the column at a flow rate of 1 ml/min in a recycle mode during 24 hr at room temperature. After that, the modified cryogel in the column was washed with 0.5 M $Na_2CO_3$ (100 ml) and then with water till pH was neutral.

TABLE 1

Supermacroporous continuous cryogels produced by co-polymerization of acrylamide with allyl glycidyl ether

| Total concentration of co-monomers in initial mixture, wt. % | Gel matrix prepared | Flow rate (at pressure equal to 1.0 m water column), cm/hr | Content of epoxy groups, µmol/ml wet gel | Swelling degree, g water/ g dry gel |
|---|---|---|---|---|
| 3.5 | Sponge like gel, rather weak | 1000* | 14 | 6.0 |
| 4.4 | Good sponge like gel | 1070 | 23 | 5.9 |
| 5.0 | Rather dense sponge like gel | 750 | 24 | 5.8 |
| 6.0 | Dense sponge like gel | 630 | 25 | 5.6 |

TABLE 2

Flow rate through monolith supermacroporous columns (i.d. 1.24 cm) prepared from co-monomer mixture with different (AAm + AGE, 10:1)/MBAAm ratio. Conditions of cryopolymerization: Temperature of freezing −12.0° C., storage 5 hr at −12° C., then overnight at −18.0° C., thawing at room temperature. Total concentration of monomers (AAm + MBAAm) 4.0 w/v %. The average value of measurements performed on three columns in parallel are presented.

| (AAm + AGE, 10:1)/MBAAm ratio | Flow rate (at pressure equal to 1.0 m water column), cm/hr |
|---|---|
| 5.4:1 | 1040 |
| 10.5:1 | 830 |
| 21:1 | 360 |

EXAMPLE 4

Preparation of the Supermacroporous Monolith Column by Co-Polymerization of Acrylamide with 2-(dimethylamino)-ethyl methacrylate.

Monomers (Table 3) were dissolved in deionized water and the mixture was degassed under vacuum. (Dimethylamino) ethyl meth-acrylate (DEM) ((AAm+DEM)/MBAAm=5.4/1, DEM/AAm=1:10) was poured into the solution. After adding TEMED (1.0% of the total weight of monomers) and ammonium persulfate (0.9% of the total weight of monomers), the reaction mixture was stirred and poured in 5 ml portions into plastic 5 ml syringes with closed outlet on the bottom. The solution in the syringes was frozen at −12° C. The frozen samples were thawed at room temperature after keeping them frozen at −12° C. for 5 hr, and then at −15.0 or −18.0° C. overnight. The cryogel matrix prepared in each syringe was washed intensively by passing 200 ml water at a flow rate of 1 ml/min.

TABLE 3

Superporous continuous cryogels produced by co-polymerization of acrylamide with (dimethylamino) ethyl methacrylate

| Total concentration of co-monomers in initial mixture, % | Swelling degree, g water/g dry gel | Flow rate (at pressure equal to 1.0 m water column), cm/hr | Content of —$N(CH_3)_2$ groups, µmol/ml wet gel |
|---|---|---|---|
| 5.0 | 5.9 | 720 | 45 |
| 6.0 | 5.5 | 760 | 59 |
| 7.0 | 4.3 | 540 | 67 |

The invention claimed is:

1. A method for the preparation of a polymer in macroporous gel form, comprising the steps of:

forming an aqueous solution by dissolving in water one or more water-soluble monomers selected from the group consisting of: acrylamide, N-substituted and non-substituted (meth)acrylamides, N-alkyl substituted N-vinylamides, hydroxyalkyl (meth)acrylates, vinylacetate, alkylethers of vinyl alcohol, ring substituted styrene derivatives, vinyl monomers, (meth)acrylic acid, silicic acid, and monomers capable of forming polymers via polycondensation, and salts thereof forming a cryogel by maintaining the aqueous solution at a temperature below the solvent crystallization point of the aqueous solution wherein the aqueous solution comprises a frozen fraction and a non-frozen fraction with the dissolved monomers concentrated in the non-frozen fraction of solution, for a length of time sufficient for the monomers to form an elastic polymer with highly interconnected pores; and after the step of forming the cryogel, thawing the cryogel, modifying the thawed cryogel, and introducing into the modified cryogel a member selected from the group consisting of ligands, charged groups, dyes and hydrophobic groups.

2. The method according to claim 1, wherein the cryogel is modified by means of a compound selected from the group consisting of alkylene diamines, glutaric aldehyde, di- and triglycidyl compounds and divinyl-sulfone.

3. The method according to claim 1, wherein when the monomer is any one of acrylamide, N-substituted and non-substituted (meth)acrylamides, or N-alkyl substituted N-vinylamides, the step of modifying the cyrogel further comprises:

transamidating the thawed cryogel with ethylenediamine, and wherein the step of introducing into the modified cryogel a member further comprises the steps of:

treating the transamidated cryogel with divinylsulfone, adding iminodiacetic acid to the treated cryogel, and loading the cryogel with $Cu^{2+}$ ions as a ligand for binding with metal-binding peptides.

4. A method for the preparation of a polymer in macroporous gel form, comprising the steps of:

forming an aqueous solution by dissolving in water one or more water-soluble monomers selected from the group consisting of: acrylamide, N-substituted and non-substituted (meth)acrylamides, N-alkyl substituted N-vinylamides, hydroxyalkyl (meth)acrylates, vinylacetate, alkylethers of vinyl alcohol, ring substituted styrene derivatives, vinyl monomers, (meth)acrylic acid, silicic acid, and monomers capable of forming polymers via polycondensation, and salts thereof, forming a cryogel by maintaining the aqueous solution at a temperature below the solvent crystallization point of the aqueous solution wherein the aqueous solution comprises a frozen fraction and a non-frozen fraction with the dissolved monomers concentrated in the non-frozen fraction of solution, for a length of time sufficient for the monomers to form an elastic polymer with highly interconnected pores, wherein one or more of the water-soluble monomers is chemically bound to a member selected from the group consisting of ligands, charged groups, dyes and hydrophobic groups.

5. The method according to claims 1 or 4, wherein the ligand is selected from the group consisting of peptides, metal chelates, sugar derivatives, boronate derivatives, enzyme substrates and their analogues, enzyme inhibitors and their analogues, protein inhibitors, antibodies and their fragments, ligand structures obtained via combinatorial chemistry and thiol-containing substances.

6. The method according to claim 5, wherein polymerization is carried out in the presence of a filler.

7. The method according to claim 6, wherein the filler is selected from the group consisting of particulate metals and metal oxides.

8. The method according to claim 6, wherein the filler is selected from the group consisting of ion exchange substances in the form of particles.

9. The method according to claims 1 or 4, wherein the polymerization is carried out in the presence of a cross-linking agent.

* * * * *